United States Patent [19]

Walba et al.

[11] Patent Number: 5,596,434
[45] Date of Patent: Jan. 21, 1997

[54] SELF-ASSEMBLED MONOLAYERS FOR LIQUID CRYSTAL ALIGNMENT

[75] Inventors: David M. Walba; Charles A. Liberko, both of Boulder, Colo.

[73] Assignee: University Research Corporation, Boulder, Colo.

[21] Appl. No.: 125,909

[22] Filed: Sep. 24, 1993

[51] Int. Cl.⁶ .................. G02F 1/1337; G02F 1/1333
[52] U.S. Cl. .................. 349/123; 349/124; 349/130; 349/131; 349/158
[58] Field of Search .................. 359/75, 76, 77, 359/78, 82

[56] References Cited

U.S. PATENT DOCUMENTS

| | | | |
|---|---|---|---|
| 4,921,728 | 5/1990 | Takiguchi et al. | 427/58 |
| 5,077,085 | 12/1991 | Schnur et al. | 427/98 |
| 5,132,816 | 7/1992 | Itoh et al. | 359/75 |

OTHER PUBLICATIONS

L. Netzger et al., "A New Approach to Construction of Artificial Monolayer Assemblies", vol. 105, pp. 674–676, 1983.

Wand et al., "An Easily Aligned Deformable Helix Ferroelectric Liquid Crystal Mixture and Its Use in Devices", Liquid Crystal Materials, Devices, and Applications, Proceedings SPIE – The Internatl. Soc. for Opt. Eng., vol. 1665, 1992, pp. 176–183.

*Primary Examiner*—Anita Pellman Gross
*Assistant Examiner*—Walter J. Malinowski
*Attorney, Agent, or Firm*—Greenlee, Winner And Sullivan, P.C.

[57] ABSTRACT

A method of aligning liquid crystals in the construction of liquid crystal cell for use in optical devices is provided. The method involves formation of a self-assembled monolayer on substrates used to form the cells. The substrate having the monolayer are then rubbed in one direction. Two substrates are combined with rubbing directions anti-parallel and spaced to form a cell. A liquid crystal is then inserted and aligned between the substrates. High quality alignment is achieved with this method.

20 Claims, No Drawings

SELF-ASSEMBLED MONOLAYERS FOR LIQUID CRYSTAL ALIGNMENT

This invention was made with at least partial support of the United States Government which has certain rights in this invention. This invention was made with partial support of the Office of Naval Research Grant N00014-89-J-1879.

FIELD OF THE INVENTION

The present invention relates to the alignment of liquid crystals (LCs). Alignment refers to an interaction of the LC molecules with either an external electric or magnetic field, or with solid surfaces (the LC cell substrates) such that the molecules are oriented in a desired way. This orientation typically occurs at a macroscopic level, for example across the entire liquid crystal cell. Specifically, this invention refers to a new type of solid substrate for LC alignment.

BACKGROUND OF THE INVENTION

Typically LCs are aligned by rubbed polymer films. The rubbing imparts an orientation to the film, which is then transferred to the LC sample when the LC is placed in contact with the treated surface. Alignment has also been achieved using a protocol where the glass plates are treated with a solution of molecules of the general structure $Cl_3SiR^1$ or $(R^2O)_3SiR^1$, where $R^1$ can be an alkyl group or, for example, a mesogenic structure, and $R^a$ is a methyl or ethyl group. This results in a surface covered with a very thin polymeric film of the polysiloxane type where some of the silicones are covalently attached to the glass substrate. Typically, these surfaces are not well characterized before being used for LC alignment.

However, it is known that extremely high quality polysiloxane monolayers on glass, or alkylthiols on gold, can be obtained (see for example: L. Netzer and J. Sagiv, *J. Am. Chem. Soc.*, 105, 674–676 (1983). These self-assembled monolayers (SAMs) result when polymer precursor molecules assemble on the surface prior to polymerization to form a "perfect" monolayer, then polymerize from this self-assembled pre-polymer. Often, very similar protocols lead to qualitatively different surfaces. A true self-assembled monolayer should afford complete coverage and give a surface which, when formed on very smooth "float glass" is just as smooth as the glass substrate. The quality of the SAM can be tested by atomic force microscopy. A poor surface will exhibit features on the order of tens of Å, with pits. A true SAM will exhibit an atomic force microscope scan indistinguishable from a smooth float glass surface. In addition, while glass wets with water, the poor treated surface will exhibit some wetability, and the true SAM will not wet at all. True SAMs can also be characterized by other techniques, such as atom scattering, and SAMs on other substrates, such as silicon, can be characterized by techniques such as ellipsometry and IR spectroscopy.

DESCRIPTION OF THE INVENTION

We have discovered that true SAMs on glass can give novel and useful LC alignment. For example, when two true SAM-treated glass plates, rubbed and oriented antiparallel, are formed into an LC cell with a smectic C* mesogen (a ferroelectric liquid crystal), then the sample provides a Schlieren monodomain in the absence of applied fields (i.e., homeotropic alignment at the surfaces, with a helix coherent across the entire cell) when the cell thickness is large relative to the C* helix pitch, and a uniformly tilted homeotropic monodomain when the cell is thin relative to the helix pitch. Application of electric fields parallel to the surfaces switches the director field in either case (in the former case the effect is a deformable helix ferroelectric liquid crystal effect), affording an electrooptic modulation when the cell is viewed between crossed polarizers. The response times of such cells are similar to those observed for Clark-Lagerwall SSFLC cells (N. A. Clark and S. T. Lagerwall, *Appl. Phys. Lett.*, 36, 899–901 (1980); N. A. Clark; S. T. Lagerwall, "Surface Stabilized Ferroelectric Liquid Crystal Devices," U.S. Pat. No. 4,367,924, Jan. 8, 1980) at similar field strengths.

EXAMPLES

A true SAM on float glass (Fischer scientific microscope slides) is formed by first making a solution of tetradecyltriethoxysilane (2% by weight) in toluene (not dried) and a small amount of n-butylamine. After the solution has cured for 20 min, the glass slide is dipped into the solution and left to soak for 10 min. The slide is then removed from the solution and comes out dry. The surface can be rinsed with soap solution, then with clean water, and the surface is then allowed to air dry. This type of process for forming true SAMs is known to those skilled in the art of making true SAMs. Atomic force microscopy shows that the surface is flat to a few Å. The behavior of water on the surface (no wetting) is also diagnostic of a true SAM.

The surface is then rubbed with a Kim wipe™ in one direction. Two such plates are oriented antiparallel, appropriately spaced, and an achiral smectic C mixture, for example ZL13234B (E. Merk, Darmstadt) is introduced between the plates by capillary action on the isotropic liquid. Cooling the sample into the nematic phase from the isotropic liquid then gives a homeotropic sample with no observable birefringence by polarized light microscopy. When a poor siloxane-treated surface (which shows surface roughness by atomic force microscopy and some wetability) or a surface treated with hexadecyltrimethylamonium bromide is used to make a cell in the same way (employing antiparallel rubbing), then an easily observable pretilted nematic phase results which is birefringent by polarized light microscopy and appears to have the director tilted in the rubbing direction.

When the cell fabricated using the true SAM is cooled into the smectic A phase, a homeotropic sample results (the transition is invisible by polarized light microscopy). When the sample is then cooled into the smectic C phase, a very homogeneous birefringent sample results, which affords extinction in the polarized light microscope when the polarizer is parallel to the plane of the rubbing and the analyzer is crossed to 90° from the plane of the rubbing. When the cell is fabricated with metal electrodes acting as spacers such that an electric field can be applied parallel to the surfaces normal to the rubbing plane, no response of the LC is observed at fields up to 20 mV/μm.

When a similar cell is fabricated using the chiral smectic LC material SCE9 (BDH), then the behavior of the cell is similar except that the C* phase shows a dark, non-birefringent texture. This sample is a Schlieren monodomain with the LC in a homeotropic alignment and the C* helix normal to the surface and coherent throughout the sample. Application of electric fields parallel to the surfaces then affords an electrooptic effect between crossed polarizers where the transmission is proportional to the applied field. Some change in the transmission is observable with very small fields (0.1 mV/μ), and the effect did not saturate up to 20 mV/μm.

A similar cell fabricated using the poor siloxane coating gave a somewhat similar result, but the alignment was not of as high a quality as was obtained using the true SAM.

The amount of transmitted light was dependent upon the sign of the applied field. More transmission occurred when the field was applied parallel to the ferroelectric polarization of the molecules at the surface than was obtained when the field was antiparallel to the polarization of the molecules at the surface.

When the racemic LC material W346 was doped with a small amount of enantiomerically pure FLC material W314 to afford an FLC mixture with a long helix pitch and small polarization, and a similar cell was fabricated, then a homogeneous birefringent texture was observed for the C* phase, with extinction occurring when the polarizer was parallel to the rubbing plane. Application of an electric field normal to the rubbing plane afforded an analog electrooptic effect.

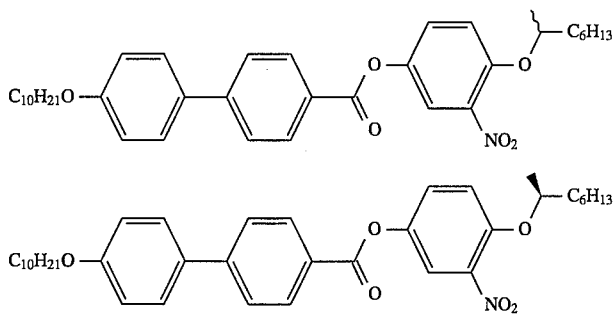

The response times observed for the SCE9 cells was about 6 msec driving to a transmitting state and about 7 msec relaxing to the non-birefringent state upon removal of the field. This behavior is that expected for a deformable helix effect in a C* material.

Those of ordinary skill in the art will appreciate that the methods and alignment layers of this invention can be employed for alignment of any type of liquid crystal for preparation of aligned samples of liquid crystal for use in any type of optical device or modulator. Transparent or semi-transparent substrates in this invention include a variety of glasses. The alignment methods of this invention can be readily adapted to fabrication of reflection mode devices which include reflective or partially reflective substrates.

We claim:

1. A self-assembled monolayer for alignment of liquid crystals formed by treating a substrate adaptable for use in a liquid crystal cell with tetradecyltriethoxysilane.

2. The self-assembled monolayer of claim 1 wherein the substrate is float glass.

3. The self-assembled monolayer of claim 1 which is formed by treatment of said substrate with a solution comprising tetradecyltriethoxysilane and n-butylamine.

4. A method of aligning a liquid crystal between two transparent or semi-transparent substrates for use in a liquid crystal cell which comprises:
   forming a self-assembled monolayer on each of said substrates;
   rubbing the surface of each of said treated substrates having said monolayer in one direction;
   forming a liquid crystal cell by overlaying the two treated substrates and interposing an appropriately sized spacer therebetween such that the rubbing directions of the two plates are in an antiparallel orientation; and
   introducing a liquid crystal between said spaced antiparallel substrates.

5. The method of claim 4 wherein said self-assembled monolayer is formed on said substrates by treating said substrates with tetradecyltriethoxylsilane.

6. The method of claim 5 wherein said self-assembled monolayer is formed by treating said substrates with a solution comprising tetradecyltriethoxysilane and n-butylamine.

7. A liquid crystal cell comprising an aligned liquid crystal wherein said liquid crystal is aligned employing a self-assembled monolayer.

8. The liquid crystal cell of claim 7 wherein said liquid crystal is a chiral smectic liquid crystal.

9. The liquid crystal cell of claim 7 wherein said liquid crystal is a nematic liquid crystal.

10. The liquid crystal cell of claim 7 wherein said liquid crystal is in a homeotropic alignment with liquid crystal helix normal to the substrate surface and wherein said liquid crystal helices are coherent throughout the cell.

11. The liquid crystal cell of claim 7 wherein said liquid crystal cell is homeotropically aligned and in which the directors of the liquid crystal molecules have uniform tilt.

12. The liquid crystal cell of claim 7 comprising a transparent or semi-transparent substrate wherein said self-assembled monolayer is formed on a surface of said substrate.

13. The liquid crystal cell of claim 7 which is a deformable helix ferroelectric effect cell.

14. An optical device containing the liquid crystal cell of claim 7.

15. A method of aligning a liquid crystal between two transparent or semi-transparent substrates for use in a liquid crystal cell which comprises:
   forming a self-assembled monolayer on said substrates such that the surface of said substrates is flat to less than 10 Angstroms as measured by atomic force microscopy;
   rubbing the surface of said treated substrates having said monolayer in one direction;
   forming a liquid crystal cell by overlaying the two treated rubbed substrates and interposing an appropriately sized spacer therebetween such that the rubbing directions of the two plates are in an antiparallel orientation with respect to each other; and
   introducing a liquid crystal between said spaced antiparallel substrates such that said liquid crystal is aligned.

16. The method of claim 15 wherein the surfaces of said substrates display no wettability.

17. A substrate adaptable for use in a liquid crystal cell having on one surface a self-assembled monolayer which is formed by treating said surface with tetradecyltriethoxysilane.

18. The substrate of claim 17 wherein said self-assembled monolayer is formed by treating a surface of said substrate with a solution comprising tetradecyltriethoxysilane and n-butylamine.

19. A liquid crystal cell comprising a transparent or semi-transparent substrate with a self-assembled monolayer formed on a surface of said substrate and an aligned liquid crystal wherein said liquid crystal is aligned employing a self-assembled monolayer and wherein said self-assembled monolayer is formed on said substrate by treating said substrate with tetradecyltriethoxysilane.

20. The liquid crystal cell of claim 19 wherein said self-assembled monolayer is formed by treating said substrate with a solution comprising tetradecyltriethoxysilane and n-butyl amine.

* * * * *